(12) United States Patent
Nash

(10) Patent No.: US 10,625,106 B2
(45) Date of Patent: Apr. 21, 2020

(54) ANTI-CONNECTION DEVICE FOR FALL PROTECTION APPARATUS

(71) Applicant: Latchways Plc, Devizes (GB)

(72) Inventor: David Nash, Devizes (GB)

(73) Assignee: Latchways Plc, Devizes (GB)

( * ) Notice: Subject to any disclaimer, the term of this patent is extended or adjusted under 35 U.S.C. 154(b) by 288 days.

(21) Appl. No.: 15/122,685

(22) PCT Filed: Mar. 3, 2015

(86) PCT No.: PCT/GB2015/050612
§ 371 (c)(1),
(2) Date: Aug. 31, 2016

(87) PCT Pub. No.: WO2015/132578
PCT Pub. Date: Sep. 11, 2015

(65) Prior Publication Data
US 2017/0120088 A1    May 4, 2017

(30) Foreign Application Priority Data

Mar. 4, 2014 (GB) .................................. 1403754.3

(51) Int. Cl.
*A62B 35/00* (2006.01)
*F16G 15/06* (2006.01)
(Continued)

(52) U.S. Cl.
CPC ............ *A62B 35/0075* (2013.01); *A45F 5/02* (2013.01); *A62B 35/0031* (2013.01); *F16G 15/06* (2013.01); *A45F 2005/006* (2013.01)

(58) Field of Classification Search
CPC ... A62B 35/0075; A62B 35/0031; A45F 5/02; A45F 2005/006; F16G 15/06;
(Continued)

(56) References Cited

U.S. PATENT DOCUMENTS

| 785,881 A | * | 3/1905 | Hill ......................... F16G 15/02 |
| | | | 59/85 |
| 1,273,689 A | * | 7/1918 | Thomas .................. F16G 15/06 |
| | | | 278/96 |

(Continued)

FOREIGN PATENT DOCUMENTS

| AU | 2009200344 A1 | 8/2009 |
| DE | 690925 | 5/1940 |

(Continued)

OTHER PUBLICATIONS

Xujing et al., "Method of Using Speed Difference Anti-dropping Device for Transmission Line", Costal Enterprises and Science & Technology, 2009, pp. 126-128, vol. 112:09, (English Translation).

*Primary Examiner* — Robert Sandy
*Assistant Examiner* — Rowland Do
(74) *Attorney, Agent, or Firm* — The Webb Law Firm

(57) ABSTRACT

Fall protection apparatus includes a self-retracting lifeline, a tether line and a link member enabling connection of the self-retracting lifeline to the tether line. An anti-connection device is fitted to the link member permitting connection to the self-retracting lifeline but inhibiting connection to other devices when connected to the self-retracting lifeline.

8 Claims, 2 Drawing Sheets

(51) Int. Cl.
*A45F 5/02* (2006.01)
*A45F 5/00* (2006.01)

(58) Field of Classification Search
CPC .... F16B 45/00; F16B 45/02; Y10T 24/45942; Y10T 24/4764
See application file for complete search history.

(56) References Cited

U.S. PATENT DOCUMENTS

| | | | |
|---|---|---|---|
| 1,642,322 A * | 9/1927 | Beck | F16B 45/02 |
| | | | 24/599.2 |
| 1,751,309 A * | 3/1930 | De Mone | B66C 1/12 |
| | | | 24/115 R |
| 4,019,609 A * | 4/1977 | Wagner | A62B 1/06 |
| | | | 182/5 |
| 4,036,010 A * | 7/1977 | Hedman | F16G 13/14 |
| | | | 59/84 |
| 4,060,978 A * | 12/1977 | McBain | F16G 13/00 |
| | | | 59/78 |
| 4,134,255 A * | 1/1979 | McBain | F16G 13/00 |
| | | | 59/78 |
| 5,331,802 A | 7/1994 | Varley | |
| 6,053,279 A | 4/2000 | McKenna | |
| 6,282,879 B1 * | 9/2001 | Bonaiti | F16G 15/06 |
| | | | 59/86 |
| 6,684,619 B2 * | 2/2004 | Hara | E01F 13/022 |
| | | | 59/78 |
| 7,997,056 B2 * | 8/2011 | Segura | B66C 1/10 |
| | | | 59/78 |
| 9,273,717 B2 * | 3/2016 | Schlangen | F16B 45/02 |
| 2007/0186393 A1 | 8/2007 | Thompson | |
| 2011/0265442 A1 * | 11/2011 | Segura | B66C 1/10 |
| | | | 59/86 |
| 2012/0159987 A1 * | 6/2012 | Walchle | F16B 45/00 |
| | | | 63/3.2 |
| 2013/0299279 A1 | 11/2013 | Pierce et al. | |
| 2015/0121836 A1 * | 5/2015 | Moreau | F16G 15/06 |
| | | | 59/86 |

FOREIGN PATENT DOCUMENTS

| | | |
|---|---|---|
| EP | 1389481 A1 | 2/2004 |
| GB | 345560 | 3/1931 |
| GB | 1452358 A | 10/1976 |
| JP | 10313907 A | 12/1998 |
| RO | 107300 B | 10/1993 |
| WO | 9110845 | 7/1991 |

* cited by examiner

ANTI-CONNECTION DEVICE FOR FALL PROTECTION APPARATUS

CROSS-REFERENCE TO RELATED APPLICATIONS

This application is the United States national phase of International Application No. PCT/GB2015/050612 filed Mar. 3, 2015, and claims priority to United Kingdom Patent Application No. 1403754.3 filed Mar. 4, 2014, the disclosures of which are hereby incorporated in their entirety by reference.

BACKGROUND OF THE INVENTION

Field of the Invention

This invention relates generally to an anti-connection device for fall protection apparatus.

Description of Related Art

There are circumstances in which it is desirable to ensure that an operative wearing a safety harness cannot mistakenly connect to a particular link or clasp. The present invention seeks to address this issue. An example of this is in connection with self-retracting lifelines used on tall structures such as offshore wind turbines or other tower structures. In such instances the connection end of the self-retracting lifeline (to which the user will connect the karabiner of his personal harness) may be connected to a retriever tether line. The tether line hangs down below the self-retracting lifeline and can be used to draw the self-retracting lifeline out from its housing mounted atop the wind turbine or other tower structures. The connection of the tether line to the connection end of the self-retracting lifeline may be by means of a shackle or other link connector.

Such an arrangement runs the risk that an operative connects their harness karabiner mistakenly to the shackle rather than the end connector of the self-retracting lifeline. This can have serious consequences in the event of a fall event because the shackle connector is not designed to arrest a fall and may consequently not be sufficiently robust to cope with the fall arrest and fail causing the operative to fall.

An improved arrangement has now been devised.

SUMMARY OF THE INVENTION

According to a first aspect, the present invention provides fall protection apparatus comprising:

i) a link member for connection to a safety life line device; and ii) an anti-connection device fitted to the link member, wherein when fitted to the link member, the body of the anti-connection device at least partially blocks access to connect to the link member.

It is preferred that the link member has an open part for connection to the safety life line device; wherein when fitted to the link member, the body of the anti-connection device at least partially blocks the open part of the link member.

The apparatus is beneficially configured to permit the karabiner or other connection device to be connected to the link member with the anti-connection device in place.

The body of the anti-connection device is preferably provided with a pair of spaced formations for accommodating spaced portions of the link member.

The spaced formations may comprise apertures extending through the body through which spaced lengths of the link member extend in use.

It is preferred that the anti-connection device bridges an open part of the link member.

In certain embodiments, it may be preferred that the link member comprises a shackle.

According to a second aspect the invention provides fall protection apparatus comprising:

i) a self-retracting lifeline;

ii) a tether line;

iii) a link member enabling connection of the self-retracting lifeline to the tether line;

iv) an anti-connection device fitted to the link member permitting connection to the self-retracting lifeline but inhibiting connection to other devices when connected to the self-retracting lifeline.

According to a further aspect, the invention provides an anti-connection device for fall protection apparatus, the device comprising a body arranged to be fitted to a link member having an open part, wherein when fitted to the link member, the body of the anti-connection device at least partially blocks the open part of the link member.

It will be appreciated that preferred features relating to the first aspect of the invention may also be preferred in respect of the further aspects of the invention.

These and other aspects of the present invention will be apparent from and elucidated with reference to, the embodiment described herein.

An embodiment of the present invention will now be described, by way of example only, and with reference to the accompany drawings.

DETAILED DESCRIPTION OF THE INVENTION

Figure 1:
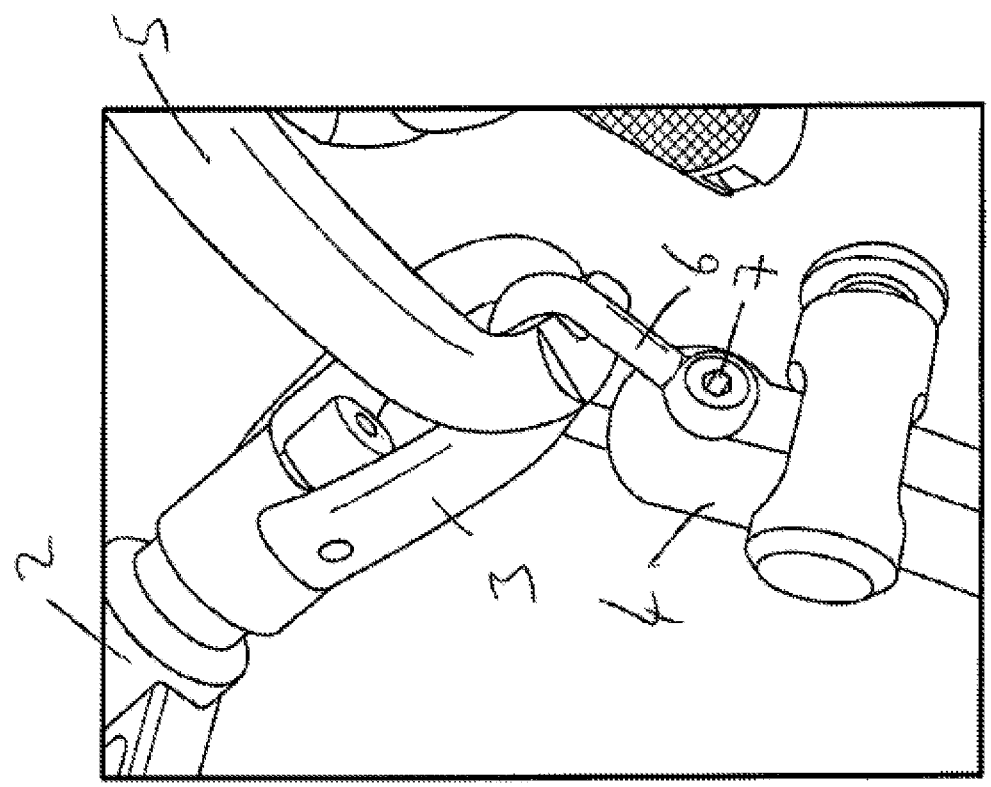
FIG. 1 is a perspective view of a link connection for fall protection apparatus according to the prior art.

Referring to the drawings, an example of the applicability of the invention is in connection with self-retracting lifelines used on tall structures such as offshore wind turbines or other tower structures. In such instances the connection end connector 3 of the self-retracting lifeline 2 (to which the user will connect the karabiner 5 of their personal harness) may be connected to a retriever tether line 4. The tether line hangs down below the self-retracting lifeline and can be used to draw the self-retracting lifeline out from its housing mounted atop the wind turbine or other tower structures. The connection of the tether line to the connection end of the self-retracting lifeline may be by means of a shackle 6 or other link connector.

When the user has retrieved the connector end 3 of the self-retracting Lifeline 2 using the tetherline 4 the user connects the karabiner 5 to the end connector 3. This is the situation shown in FIG. 1. Once connected to the end connector 3 of the self-retracting lifeline 2, the user can safely ascend the wind turbine or other tower structure to which the self-retracting lifeline is connected.

Figure 2:
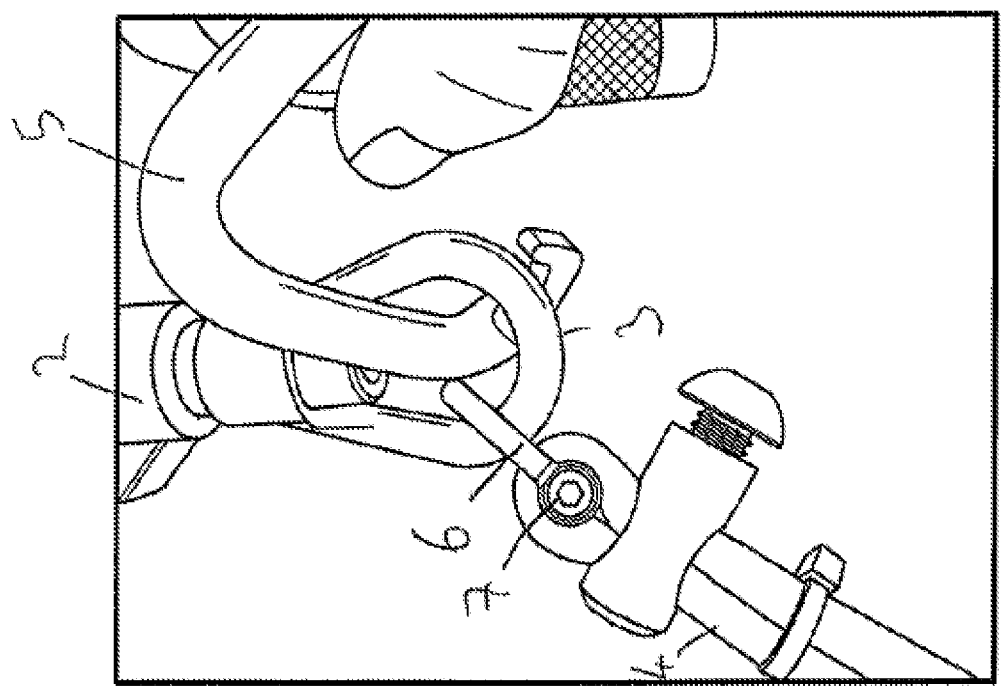
FIG. 2 is a perspective view of a link connection for fall protection apparatus and a connection arrangement according to the prior art.

Unfortunately in certain circumstances there is the potential for the user to inadvertently connect the karabiner 5 through the shackle 6 rather than the end connector 3 of the self-retracting Lifeline. This is the situation shown in FIG. 2. In such circumstances there is real risk that, in the event of a fall situation, the fall protection apparatus will not operate to ensure the safety of the operative. This is because the shackle 6 is not designed to take the impulse load which occurs in the event of a fall arrest situation.

Figure 3:
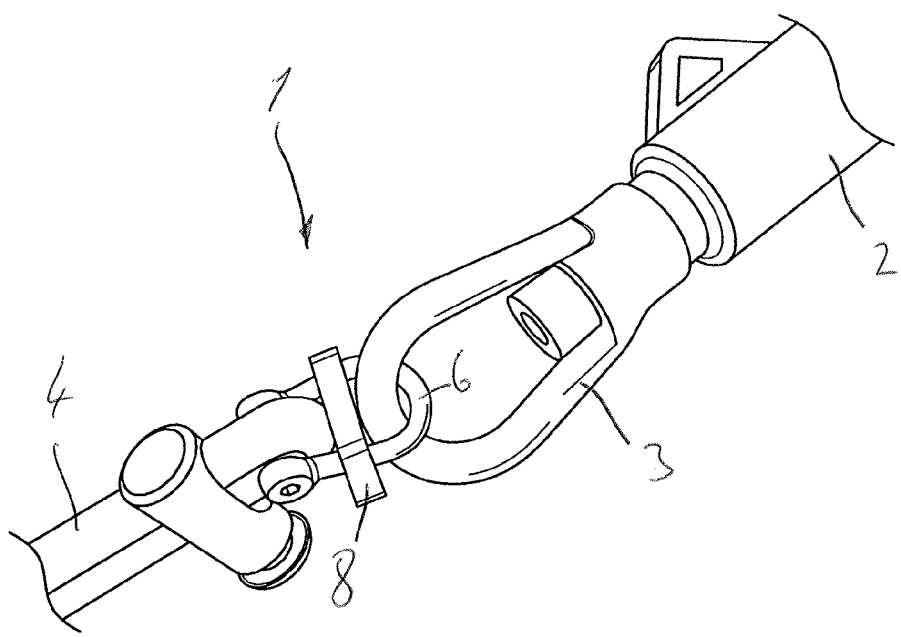
FIG. 3 is a perspective view of an apparatus in accordance with the principles of the present invention.
Figure 4:
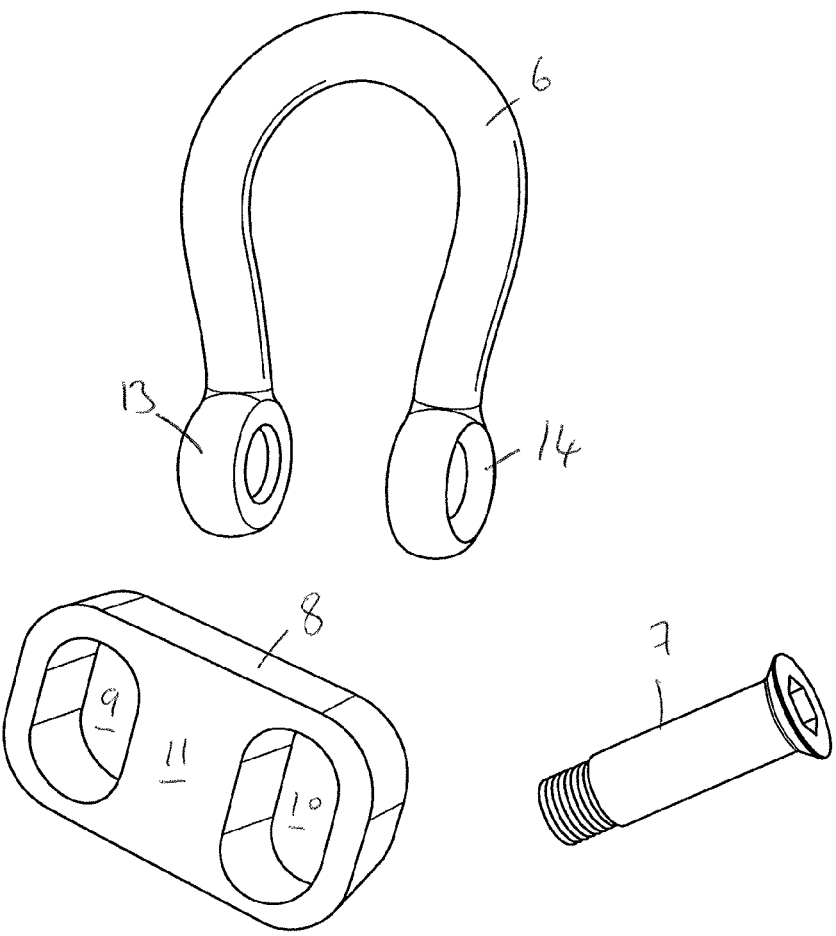
FIG. 4 is an exploded, perspective view of a link member with an anti-connection device in accordance with the principles of the present invention.

Turning to the apparatus of the present invention, this is shown most clearly in FIGS. 3 and 4. In the arrangement shown the anti-connection device 8 is fitted to the shackle 6 such that when the shackle 6 is connected to the end connector 3 of the self-retracting Lifeline 2, there is no possibility that a karabiner 5 (or any other connection device) can additionally and inadvertently be secured through the shackle.

When the user connects the Karabiner 5 to the system the likelihood for the arrangement shown in FIG. 3 is that it will be correctly connected through the opening of the end connector 3 of the self-retracting lifeline 2 as there is no possibility of connecting through the opening of shackle 6 which is blocked by the anti-connection device 8.

FIG. 4 shows the shackle 6 and anti-connection device 8 in more detail. The shackle is shown with the shackle bolt 7 removed. The anti-connection device 8 is shown to have spaced side apertures 9, 10 and a bridge portion 11 extending between the spaced apertures 9, 10. In use the ends 13 14 of the shackle pass through the spaced apertures 9, 10 and the shackle bolt 7 secures through the shackle ensuring that the anti-connection device 8 is retained fitted on the shackle 6. The bridge portion 11 blocks the open part of the shackle 6 to the extent determined by the thickness of the anti-connection device 8.

It should be noted that the above-mentioned embodiment illustrates rather than limits the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

The invention claimed is:

1. A fall protection apparatus, comprising:
   i) a self-retracting lifeline;
   ii) a tether line;
   iii) a link member having a pair of spaced portions, the link member configured to connect the self-retracting lifeline to the tether line; and
   iv) an anti-connection device fitted to the link member, the anti-connection device having a body with a pair of apertures each extending through the body and having a continuous edge about a longitudinal axis, the pair of apertures separated by a bridge portion, each of the apertures configured for receiving one of the spaced portions of the link member,
   wherein the anti-connection device is positioned to permit connection of the link member to the self-retracting lifeline and to the tether line but inhibiting connection of the link member to other devices when the link member is connected to the self-retracting lifeline and the tether line.

2. The fall protection apparatus according to claim 1, wherein the link member has an open part for connection to the self-retracting lifeline; and wherein, when fitted to the link member, a body of the anti-connection device at least partially blocks the open part of the link member.

3. The fall protection apparatus according to claim 2, wherein the apparatus is configured to permit a connection device to be connected to the link member with the anti-connection device in place.

4. The fall protection apparatus according to claim 2, wherein the anti-connection device bridges an open part of the link member.

5. The fall protection apparatus according to claim 1, wherein the apparatus is configured to permit a connection device to be connected to the link member with the anti-connection device in place.

6. The fall protection apparatus according to claim 5, wherein the anti-connection device bridges an open part of the link member.

7. The fall protection apparatus according to claim 1, wherein the anti-connection device bridges an open part of the link member.

8. The fall protection apparatus according to claim 1, wherein the link member comprises a shackle.

\* \* \* \* \*